United States Patent [19]

Kuriyama et al.

[11] Patent Number: 4,954,947

[45] Date of Patent: Sep. 4, 1990

[54] INSTRUCTION PROCESSOR FOR PROCESSING BRANCH INSTRUCTION AT HIGH SPEED

[75] Inventors: Kazunori Kuriyama, Kokubunji; Kenichi Wada, Sagamihara; Akira Yamaoka, Kokubunji, all of Japan

[73] Assignee: Hitachi, Ltd., Tokyo, Japan

[21] Appl. No.: 336,741

[22] Filed: Mar. 21, 1989

Related U.S. Application Data

[63] Continuation of Ser. No. 859,901, May 5, 1986, abandoned.

[30] Foreign Application Priority Data

May 7, 1985 [JP] Japan .................................. 60-95444

[51] Int. Cl.⁵ .......................... G06F 9/30; G06F 9/32; G06F 9/38; G06F 9/42
[52] U.S. Cl. ................................ 364/200; 364/231.8; 364/258; 364/258.1; 364/259; 364/261.3; 364/261.9; 364/252; 364/252.2
[58] Field of Search ............... 364/200, 900, 300, 736, 364/740, 741, 747, 770

[56] References Cited

U.S. PATENT DOCUMENTS

| | | | |
|---|---|---|---|
| 4,075,688 | 2/1978 | Lynch, Jr. et al. | 364/200 |
| 4,197,578 | 4/1980 | Wada et al. | 364/200 |
| 4,295,193 | 10/1981 | Pomerene | 364/200 |
| 4,325,120 | 4/1982 | Colley et al. | 364/200 |
| 4,365,311 | 12/1982 | Fukunaga et al. | 364/900 |
| 4,398,245 | 8/1983 | Fujita | 364/200 |
| 4,409,654 | 10/1983 | Wada et al. | 364/200 |
| 4,435,756 | 3/1984 | Potash | 364/200 |
| 4,454,578 | 6/1984 | Matsumoto | 364/200 |
| 4,471,433 | 9/1984 | Matsumoto et al. | 364/200 |
| 4,541,047 | 9/1985 | Wada et al. | 364/200 |
| 4,580,238 | 4/1986 | Sawada | 364/736 |
| 4,594,655 | 6/1986 | Hao | 364/200 |
| 4,719,570 | 1/1988 | Kawabe | 364/200 |

FOREIGN PATENT DOCUMENTS

| | | | |
|---|---|---|---|
| 54-41641 | 4/1979 | Japan | 364/200 |
| 60-178539A | 9/1985 | Japan . | |
| 60-204036A | 10/1985 | Japan . | |

OTHER PUBLICATIONS

J. S. Liptay et al., "Load Bypass for Address Arithmetic", IBM Technical Disclosure Bulletin, vol. 20, No. 9, (Feb. 1978), pp. 3606–3607.

J. M. Angiulli et al., "Enhancements in Implementing Load Address", IBM Technical Disclosure Bulletin, vol. 23, No. 6, (Nov. 1980), pp. 2401–2403.

*Primary Examiner*—Archie E. Williams, Jr.
*Assistant Examiner*—Robert B. Harrell
*Attorney, Agent, or Firm*—Antonelli, Terry, Stout & Kraus

[57] ABSTRACT

An instruction processor effecting operations for register operands and for processing branch instructions to perform address calculations for branch destination instructions, comprising general-purpose registers storing data including results of operations of said instruction processor, address adders calculating the address of branch destination instructions by using data read out from the general-purpose register and an ALU performing arithmetical or logical operations on the data read out from the general-purpose register in the decode cycle of the instructions. The result of the arithmetical or logical operation is inputted into the address adder but not from the general-purpose register, in the case where the result of the arithmetical or logical operation is utilized for address calculation in the execution of a succeeding instruction.

9 Claims, 3 Drawing Sheets

INSTRUCTION PROCESSOR FOR PROCESSING BRANCH INSTRUCTION AT HIGH SPEED

This application is a continuation of application Ser. No. 859,901, filed on May 5, 1986.

BACKGROUND OF THE INVENTION

1. FIELD OF THE INVENTION

This invention relates to an instruction processor having a plurality of address adders and in particular to an instruction processor suitable for processing branch instructions which perform operations for register operands and at the same time perform address calculations for branch destination instructions.

2. DESCRIPTION OF THE RELATED ART

In an instruction processor to which this invention is applied, an instruction is treated in five cycles, D, A, L, E, and P. In the D cycle, decoding of the instruction and address calculations therefor are performed; in the A cycle a memory operand is fetched from the buffer storage; in the L cycle a fetched operand is transmitted; in the E cycle necessary predetermined operation by the instruction is executed; and in the P cycle the result of the operation is written in a general-purpose register. As a method for advancing address calculations for a succeeding instruction, in the case where the succeeding instruction utilizes the content of the general-purpose register changed by a preceding instruction in an instruction processor, heretofore it has been proposed in Japanese Patent Unexamined Publication No. 41641/79, to dispose a simple auxiliary arithmetical or logical operation unit (ALU) apart from the main ALU, to process the instruction changing the content of the general-purpose register with a high speed in the auxiliary ALU unit, and to input the result of the operations not through the general-purpose register but directly in the address adder so that it can be utilized for the address calculations for the succeeding instruction. In this case, the operation by the auxiliary ALU is performed in the E cycle of the auxiliary ALU, which cycle is earlier by one cycle than the E cycle for the main ALU to perform the operation. However, since the succeeding instruction cannot begin its D cycle immediately after the end of the D cycle of the preceding instruction until the end of the execution in the auxiliary ALU there has been an overhead in the D cycle.

SUMMARY OF THE INVENTION

The object of this invention is to provide an instruction processor, which can effect address calculation for the branch destination instruction and at the same time effect operations for register operands, so that address calculations of a succeeding instruction can be advanced by utilizing the result of the operations.

Instead of the auxiliary ALU, which has been utilized for the instruction processor, it is possible to use existing address adders for the instructions to perform addition or subtraction such as counting branch instructions. The instruction processor can be so constructed that the address addition is performed in the D cycle, in which the instruction is effected, i.e., in the decode cycle, and the address calculation of the succeeding instruction can be started after the termination of the decode cycle of the preceding instruction without any overhead, even if it needs the result of the preceding instruction if the operations for the register operands are performed in the decode cycle by utilizing existing address adders or a similar simple ALU.

In order to be able to treat instructions having a plurality of operands in the storage with a high speed, it is sufficient to dispose a plurality of address adders so as to effect address calculations simultaneously for the operands. On the other hand, since the branch instruction calculates only the address for the branch destination instruction, some of the address adders are not in use. Consequently, when processing the branch instruction which specifies performing of operation for the register operands, it is possible to use the address adders, which are not in use as stated above, in the decode cycle for performing operation of the register operands.

Noting the items described above, an instruction processor according to this invention includes an ALU, which performs operations on the content of a general-purpose register in the decode cycle for the execution of an instruction, in the case where a branch instruction is treated and it is so constructed that, when the result of the operations in the ALU is utilized for address calculations in the execution of a succeeding instruction, the result of the operations is inputted not through the general-purpose register but directly into the address adder after the end of the D cycle of the preceding branch instruction. Consequently it is possible for the succeeding instruction to perform the address calculation in an early stage.

In an instruction processor having a plurality of address adders it is possible to add functions which are necessary for execution of operations on the content of the general-purpose register to an address adder, which is not in use, when a branch instruction is treated, in order to use the address adder instead of the ALU stated above.

According to this invention, if the content of the general-purpose register, which is modified by counting branch instructions, is utilized by succeeding instructions for address calculations of their operand address or for branch destination addresses in the case of a branch instruction, the address addition for the succeeding instructions can be performed immediately after the termination of the address calculations of the counting branch instruction without waiting for the termination of the operations of the counting branch instruction, that is, the end of the E cycle.

BRIEF DESCRIPTION OF THE DRAWINGS

These and other objects and advantages of the present invention will become apparent by reference to the following description and drawings, wherein:

FIG. 2 shows instruction forms for the counting branch instructions according to the present invention;

FIG. 3 shows flows of the instruction processings by means of the prior art devices;

FIG. 5 shows the flow of the instruction processing by means of the instruction processor according to this invention.

DESCRIPTION OF THE PREFERRED EMBODIMENT

Before the explanation of an embodiment according to this invention, a prior art instruction processor will be explained.

Figure 1:
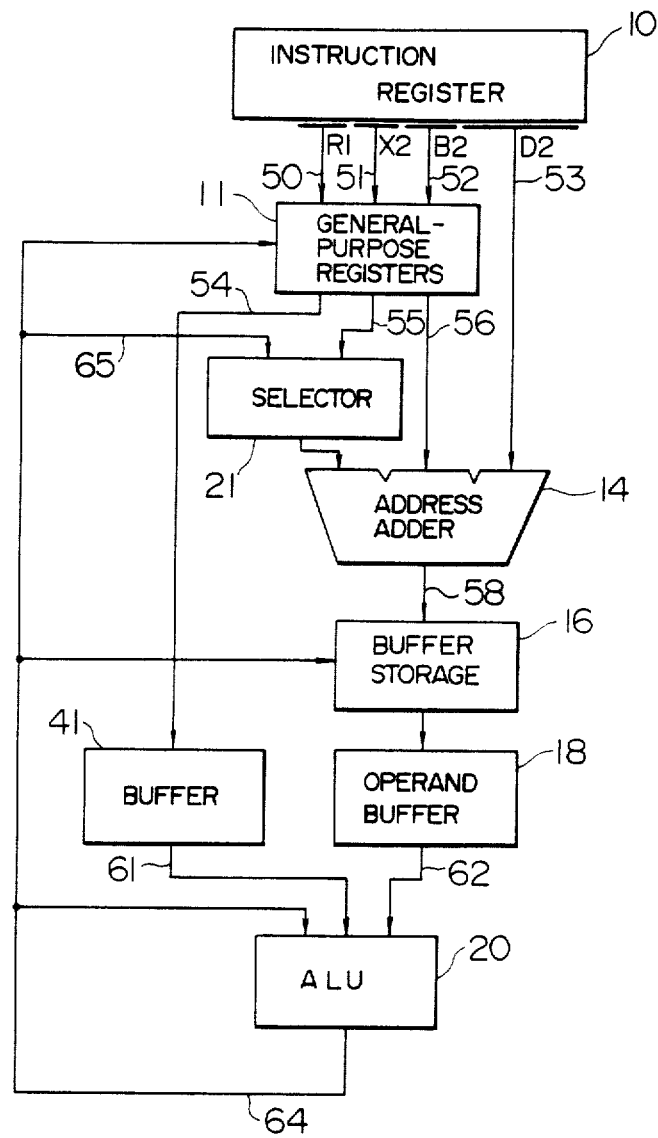
FIG. 1 shows a prior art instruction processor for treating counting branch instructions.

FIG. 1 indicates a prior art instruction processor for treating counting branch instructions. When a counting branch instruction having the form indicated in (b) of FIG. 2 is set in an instruction register 10, a portion thereof R1 indicating a first operand of the instruction is transmitted to a general-purpose register 11 through a signal line 50. Then it is sent to a buffer 41 through a signal line 54, after having read out the content of a specified register. The data stored in the buffer 41 is read out in the operation cycle of the counting branch instruction and is decreased by 1 in an ALU 20. The result of the operation is stored in general-purpose registers 11 through a signal line 64. At this time, when an instruction succeeding the counting branch instruction requires the result of the operation as an input of an address adder, the result of the operation can be inputted directly to the address adder through a signal line 65 and a selector 21. On the other hand, in parallel with the treatment described above, in order to calculate the address of the branch destination instruction, the index register number indicated by a portion X2 and the base register number indicated by a portion B2 of the counting branch instruction are sent to the general-purpose registers 11 through signal lines 51 and 52, respectively. Each of the read out data and the displacement value of the instruction are inputted in an address adder 14 through signal lines 55, 56 and 53, respectively. The address adder 14 sends the result obtained by adding three data to a buffer storage 16 through a signal line 58 and fetches the branch destination instruction. The place of storing and so forth of the branch destination instruction are not mentioned here. Also, explanation of the operand buffer 18 storing the operand read out from the buffer storage 16 is omitted.

(a) to (d) in FIG. 2 show instruction forms for the counting branch instructions. In the instruction form indicated in (a) the bits 0-7 indicate an operation code. The part R1 consisting of the bits 8-11 indicates the general-purpose register number of the first operand and the part R2 consisting of the bits 12-15 indicates the general-purpose register number holding the instruction address of the branch destination instruction. In the instruction form indicated in (b) the bits 0-7 indicate an operation code and the part R1 consisting of the bits 8-11 indicates the general-purpose register number of the first operand. Further, the part X2 consisting of the bits 12-15, the part B2 consisting of the bits 16-19 and the part D2 consisting of the bits 20-31 indicate the index register number, the base register number and the displacement value, respectively, for calculating the instruction address of the branch destination instruction. A counting branch instruction having an instruction form indicated in (a) or (b) has functions to decrease the content of the general-purpose register specified by the first operand by one, to store the result thus obtained in the same general-purpose register and at the same time to make it branch to the address specified by the second operand if the result is not equal to zero.

In the instructions indicated in (c) and (d) the bits 0-7 indicate an operation code; the part R1 consisting of the bits 8-11 and the part R3 consisting of the bits 12-15 the general-purpose register number of the first operand and that of the third operand, respectively; the part B2 consisting of the bits 16-20 and the part D2 the base register number and the displacement value, respectively, for calculating the branch destination address. For an instruction indicated in (c) the value or contents of the general-purpose register of the first operand and that of the third operand are added and if the result thus obtained is greater than the value of the general-purpose register indicated by R' (if R3 is odd, R3' = R3 and if R3 is even, R3'=R3+1), it branches to an address specified by the second operand. For an instruction indicated in (d), in the case where the result of the addition of the value of the general-purpose register of the first operand and that of the third operand is smaller than or equal to the value of the general-purpose register indicated by R3', it has a function to branch.

The branch instructions indicated in (a) and (b) are similar in the fact that both of them can effect the branch decision by using only the value of the general-purpose register. In the embodiment of this invention, in particular the treatment of the counting branch instruction indicated in (a) and (b) is taken as an example to be explained.

(a) to (c) in FIG. 3 indicate flow of the instruction processing in the prior art device, in the case where the value of the general-purpose register specified by the part R1 of the counting branch instruction is utilized by a succeeding instruction for its address calculation. In (a) to (c) of FIG. 3 the abscissa represents the flow of the instruction processing (Time) and the ordinate the series of instructions. In all of (a), (b) and (c), a and b indicate the counting branch instruction and the immediately succeeding instruction which utilizes the same general purpose register specified by the part R1 of the preceding counting branch instruction, respectively. All of the figures show the case where the counting branch instruction performs the branch decision in the D cycle and the branching is failed.

(a) in FIG. 3 indicates the case where the address calculation of the instruction b is begun after the termination of the operation of the counting branch instruction a, waiting until the result of the operation is stored in the general-purpose register, when the value of the general-purpose register changed by the counting branch instruction a is utilized by the immediately succeeding instruction b for its address calculation. In this case, although the branch decision of the counting branch instruction a is effected in the D cycle, the start of the decode of the immediately succeeding instruction is delayed by four cycles.

(b) in FIG. 3 indicates the processing, in the case where the result of the operation is inputted directly in the address adder 14 through the signal line 65 indicated in FIG. 1. Since the data can be utilized earlier by one cycle from the general purpose registers 11, the decode of the instruction b can be started three cycles after the instruction a.

(c) in FIG. 3 indicates the instruction processing, in the case where a simple operation device (auxiliary ALU) is disposed apart from the main ALU, as indicated in Japanese Patent Unexamined publication No. 41641/79, which auxiliary ALU performs the operation of the counting branch instruction a, so that the result can be utilized for the address addition for the immediately succeeding instruction. In this case, by using the auxiliary ALU, the decode of the instruction b is delayed by two cycles after the instruction a, because the result can be obtained earlier by one cycle than the operation performed by the main ALU. In this way, more than two cycles of unused time, are produced after the D cycle of the counting branch instruction until the D cycle of the succeeding instruction in the instruction processing of the prior art device, because the decoding of the immediately succeeding instruction is begun in synchronism with the operation cycle of the counting branch instruction, in the case where the general-purpose register whose content is changed by a counting branch instruction is utilized by an immediately succeeding instruction for its address calculation.

Figure 4:
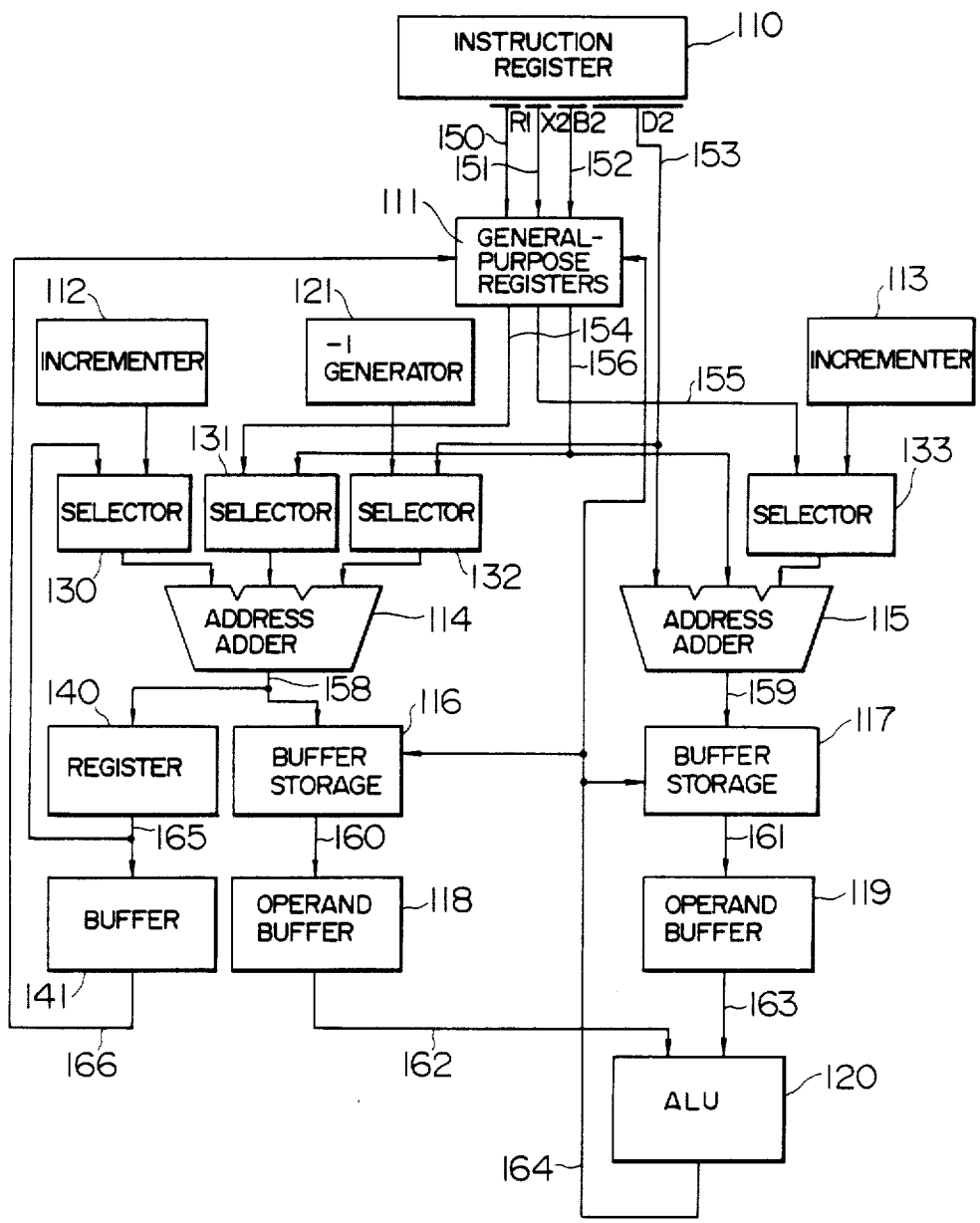
FIG. 4 shows an embodiment of an instruction processor according to the present invention for treating the counting branch instructions with a high speed.

FIG. 4 shows an embodiment of instruction processor, which can treat counting branch instructions with a high speed. In an instruction register 110, a counting branch instruction is set having the form indicated at (b) of FIG. 2. Heretofore, in the processing of counting branch instructions, subtraction for the first operand has been effected in the ALU and the address calculations for the branch destination instruction has been performed in the address adder. In the instruction processor indicated in FIG. 4, the speed of the instruction processing is increased by the fact that both of these two sorts of operations are performed in the address adder. That is, the index register number indicated by the part X1 and the base register number indicated by the part B2 are sent to general-purpose registers 111 through signal lines 151, 152 and the contents of the corresponding general-purpose register is inputted to an address adder 115 through signal lines 155, 156. The displacement value indicated by the part D2 is inputted from the instruction register 110 directly to the address adder 115 through a signal line 153. In this way the address of the branch destination instruction can be obtained by adding these three kinds of data. However, it is supposed that, during the processing of the branch instruction, a selector 133 is on the side of the general-purpose registers 111. An incrementer 113 is used for the purpose of incrementing the address in order to read out operands one after another, in the case where operands having a large number of bytes are read out which is not directly related to this invention. This is true also for another incrementer 112. The address calculated in the address adder 115 is sent to a buffer storage 117 and is used for reading out a corresponding instruction. The storing position etc. of an instruction fetched from the buffer storage 117 is not directly related to this invention, therefore, the description thereof is omitted. When an instruction for processing an operand on the buffer storage has been set in the instruction register 110, the operand address is calculated by the address adder 115, the calculation result thereof is sent to the buffer storage 117, and the operand fetched from the buffer storage 117 is sent to an operand buffer 119 through a signal line 161 and then to an ALU 120 through a signal line 163 after having been temporarily stored therein. Operations are performed there according to the instruction and the result of the operations is sent to the general-purpose registers 111, the buffer storages 116 and 117 through a signal line 164. Since these processes have no direct relation with this invention, their explanation will be omitted.

In parallel with the address calculation of the branch destination instruction by means of the address adder 115, as described above, the general-purpose register number specified by the first operand indicated by the part R1 of the instruction is sent to the general-purpose registers 111 through a signal line 150, and the corresponding data is read out and inputted in the address adder 114 through a signal line 154 and a selector 131. Further a −1 generator 121 inputs −1 to the address adder 114, where an operation to decrease the first operand by 1 can be realized. However, during the execution of the counting branch instruction, a selector 130 outputs 0; the selector 131 selects a signal line 154; and another selector 132 selects the −1 generator 121. The value thus calculated is not used as an address. That is, it is not sent to the buffer storage 116 but held in a register 140. The value held in the register 140 can be inputted in the address adder through a signal line 165 and it is at the same time stored in a buffer 141 and held until the termination of the operation for the counting branch instruction. At the moment of the termination of the counting branch instruction data read out from the buffer 141 are sent to the general-purpose registers 111 through a signal line 166 and written in a register specified by the first operand. Here, in the case where an instruction succeeding the counting branch instruction utilizes the general-purpose register specified by the first operand of the counting branch instruction for the address calculation, since the result of the operation is held in the register 140 after the termination of the subtraction in the address adder 114 for the counting branch instruction, the selector 131 is so controlled that it is inhibited to input the contents of the general-purpose registers 111 in the address adder 114 and the selector 130 is so controlled that a signal line 165 is selected. As the result, the address addition of the succeeding instruction can be effected by inputting the content of the register 140 in the address adder 114 instead of the content of the general-purpose register specified by the index register or the base register of the succeeding instruction. Therefore, it is possible to perform the address addition of the succeeding instruction after the termination of the D cycle of the preceding counting branch instruction.

In the case where the address adder 114 is used as an ALU, the −1 generator 121, which is an additional device for performing an operation function, is connected to the address adder 114. But, in the case where the address adder 114 is used for a usual address calculation, the selector 132 is so controlled that the −1 generator 121 is disconnected.

In the case where the address adder 114 is used for a usual address calculation, the result of the addition is sent to the buffer storage 116 through a signal line 158, then the fetched operand is sent to an operand buffer 118 through a signal line 160, and further to the ALU 120 through a signal line 162. However, since this process has no direct relation with this invention, explanation therefor will be omitted.

Although the embodiment indicated in FIG. 4 indicates a construction, by which the result of the operation is inputted in the address adder 114 used for the usual address addition and so forth after the address adder 114 has been used as an ALU, it can be also so constructed that it comprises a separate ALU performing arithmetical or logical operation of register operands and that the result of operations in the ALU is inputted in the address adder. Further, the device indicated in FIG. 4 can be so constructed that the result of operations in the address adder 114 stored in the register 140 is inputted to the both address adders 114 and 115. In this case a selecting means for inputting the operation result to the address adder 115 instead of the contents of the general-purpose registers is required. Although the instruction processor indicated in the embodiment indicates only 2 address adders, the number of address adders can be greater than 3, as the number of operands specified by one instruction increases. In this case it is possible to construct such that the operation results are inputted to these address adders. Furthermore, although in the embodiment it is indicated to add the −1 generator, in the case where an address adder is used as the ALU, it is also possible to add complicated functions depending on the complexity of the operation content.

FIG. 5 shows flow of the instruction processing by means of the instruction processor according to this invention, in the case where a is a counting branch instruction and b is a succeeding instruction utilizing the value of the general-purpose register changed by the counting branch instruction a, for its address calculation. Here it is supposed that the branch decision for the counting branch instruction a is effected in the D cycle and that the branch is failed. Since the operation for the general-purpose register specified by the counting branch operation is performed in the D cycle, and the succeeding instruction can utilize the result of the above performed operation immediately after the D cycle, there are produced no processing cycles, which are not in use, and thus the processing of the succeeding instruction can be begun immediately. In this way, it is possible to eliminate completely the overhead, which has been produced in the prior art device.

While particular embodiments of the invention have been shown and described, it will be obvious to those skilled in the art that various changes and modifications may be made without departing from the present invention in its broader aspect.

We claim:

1. An instruction processor for processing branch instructions to perform operations for register operands and address calculations for branch destination instructions, comprising:

an instruction register for storing instructions;

general purpose registers, connected to said instruction register, for storing data including results of arithmetic operations, a plurality of said data being read out from general-purpose registers designated by specified operands of an instruction stored in said instruction register;

at least one address adder, connected to said general-purpose registers, for calculating addresses of branch destination instructions using data read out from one of said general-purpose registers during a decode cycle of a first instruction stored in said instruction register;

an ALU operating in parallel with said at least one address adder for performing arithmetical or logical operations on data read out from one of said general-purpose registers during the decode cycle of said first instruction stored in said instruction register;

temporary store means connected to said ALU for storing temporarily the result of operations of said ALU and then storing said result in a general-purpose register; and means responsive to a second instruction stored in said instruction register following said first instruction for inputting said result of said operations performed in said ALU in response to said first instruction from said temporary store means to said ALU before said result is stored in a general-purpose register, so that said result of said operations is utilized for address calculations during the decode cycle in the execution of said second instruction.

2. An instruction processor according to claim 1, wherein said ALU comprises a further address adder for performing said arithmetical or logical operations during the execution of said first instruction and address calculation during the execution of said second instruction.

3. An instruction processor for processing instructions, comprising:

(a) an instruction register for sequentially holding instructions to be processed, including operation instructions and branch instructions;

(b) a plurality of registers coupled to said instruction register for storing data;

(c) first address adder means, coupled to said instruction register and said plurality of registers and responsive to an operation instruction in the instruction register, which operation instruction requires execution of an operation on a storage operand, for adding a first group of plural data so as to generate a storage address for the storage operand, wherein the first group of plural data includes at least data provided by one of said plurality of registers designated by the operation instruction and wherein addition of the plural data is performed during a first processing stage for the operation instruction among plural processing stages into which processing of each instruction is divided;

(d) first buffer storage means coupled to said first address adder means for holding storage operands and for providing one of the storage operands required by an operation instruction in response to receipt of a generated storage address from said first address adder means during a second processing stage following said first processing stage for the operation instruction;

(e) operation means connected to receive a storage operand from said first buffer storage means for performing an arithmetic or logical operation on the storage operand during a third processing stage following said second processing stage for the operation instruction;

(f) second address adder means, coupled to said instruction register and said plurality of registers and responsive to a branch instruction in the instruction register, which branch instruction requires execution of an addition operation on data held by a first one of said plurality of registers designated by the branch instruction and fetching of a target instruction, for adding a second group of plural data so as to generate a storage address for the target instruction, wherein the second group of plural data includes at least data provided by a second one of said plurality of registers designated by the branch instruction and wherein addition of the second group of plural data is performed in said first processing stage for the branch instruction;

(g) second buffer storage means coupled to said second address adder means for holding instructions and for providing the target instruction in response to the storage address generated by said second address adder means, the target instruction being provided in the second processing stage of the processing of the branch instruction; and (h) wherein said first address adder means includes means for adding a third group of plural data including the data held by said first one of said plurality of registers designated by a branch instruction, during the first processing stage for the branch instruction simultaneously with operation of said second address adder means to generate said storage address for the target instruction and for storing data resulting from said adding in one of said plurality of registers designated by the branch instruction.

4. An instruction processor according to claim 3, wherein said third group of plural data comprises a constant and the data held by the first one of said plurality of registers designated by the branch instruction.

5. An instruction processor according to claim 3, further comprising:
    means coupled to an output and an input of the first adder means for providing the resultant data of the addition generated as an input data to the first address adder means, when an instruction succeeding the branch instruction and held by the instruction register requires the resultant data of the addition for generation of an address of a storage operand required by the succeeding instruction, wherein providing the resultant data of the addition is done during the predetermined preceding stage for the succeeding instruction.

6. An instruction processor for processing instructions, comprising:
    (a) an instruction register for sequentially holding instructions to be processed;
    (b) a plurality of registers coupled to said instruction register for storing data;
    (c) address adder means coupled to said instruction register and said registers and responsive to a first instruction in the instruction register, which first instruction requires execution of an operation on a storage operand, for adding a first group of plural data so as to generate a storage address for the storage operand, wherein the first group of plural data includes at least data provided by one of the registers designated by the first instruction but not a storage operand, and wherein addition of the plural data is performed during a first processing stage for the first instruction among plural processing stages into which processing of each instruction is divided;
    (d) storage means coupled to said address adder means for holding storage operands and for providing one of the storage operands required by the first instruction in response to receipt of a generated storage address from said address adder means during a second processing stage following said first processing stage for the first instruction;
    (e) operation means connected to receive a storage operand from said storage means for performing an arithmetic or logical operation on the storage operand during a third processing stage following said second processing stage for the first instruction; and
    (f) wherein said address adder means includes means responsive to a second instruction in the instruction register, which second instruction requires execution of an operation on data which does not include a storage operand but includes a register operand held by one of the registers designated by the second instruction, for adding a second group of plural data including the register operand held by the register designated by the second instruction, during the first processing stage for the second instruction, and for providing data resulting from said adding to one of said registers designated by the second instruction.

7. An instruction processor according to claim 6, further comprising:
    means coupled to an output and an input of the address adder means for providing the resultant data of the addition generated as input data to the address adder means, when an instruction succeeding the second instruction and held by the instruction register requires the resultant data of the addition for generation of an address of a storage operand required by the succeeding instruction, wherein providing the resultant data of the addition is done during the predetermined preceding stage for the succeeding instruction.

8. An instruction processor for processing instructions, comprising:
    (a) an instruction register for sequentially holding instructions to be processed;
    (b) a plurality of registers coupled to said instruction register for storing data;
    (c) register operand operation means coupled to said instruction register and said registers and responsive to a first instruction in the instruction register, which first instruction requires execution of an operation on a storage operand, for performing an addition operation on a first group of plural data so as to generate a storage address for the storage operand, wherein the first group of plural data includes at least data provided by one of the registers designated by the first instruction but not a storage operand and wherein addition operation on the plural data is performed during a first processing stage for the first instruction among plural processing stages into which processing of each instruction is divided;
    (d) storage means coupled to said register operand operation means for holding storage operands and for providing one of the storage operands required by the first instruction in response to receipt of a generated storage address from said register operand operation means during a second processing stage following said first processing stage for the first instruction;
    (e) storage operand operation means connected to receive a storage operand from said storage means for performing an arithmetic or logical operation on the storage operand during a stage following said second processing stage for the first instruction; and
    (f) wherein said register operand operation means includes means responsive to a second instruction held by the instruction register, which second instruction requires execution of an operation on data which does not include a storage operand but includes a register operand held by one of the registers designated by the second instruction, for performing an operation on a second group of plural data including the register operand held by the register designated by the second instruction, during the first processing stage for the second instruction, and for providing data resulting from said operation to one of said registers designated by the second instruction.

9. An instruction processor according to claim 8, further comprising:

means coupled to an output and an input of the address adder means for providing the resultant data of the operation generated as input data to the address adder means, when an instruction succeeding the second instruction and held by the instruction register requires the resultant data of the operation for generation of an address of a storage operand required by the succeeding instruction, wherein providing the resultant data of the operation is done during the predetermined preceding stage for the succeeding instruction.

* * * * *